(12) United States Patent
Ku

(10) Patent No.: US 6,907,534 B2
(45) Date of Patent: Jun. 14, 2005

(54) MINIMIZING POWER CONSUMPTION IN PIPELINED CIRCUIT BY SHUTTING DOWN PIPELINED CIRCUIT IN RESPONSE TO PREDETERMINED PERIOD OF TIME HAVING EXPIRED

(75) Inventor: Joseph Ku, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 712 days.

(21) Appl. No.: 09/894,142

(22) Filed: Jun. 29, 2001

(65) Prior Publication Data

US 2003/0005340 A1 Jan. 2, 2003

(51) Int. Cl.[7] .............................. G06F 1/32; G06F 1/26; H03K 17/23
(52) U.S. Cl. ....................... 713/320; 713/323; 713/330; 326/35
(58) Field of Search ................................. 713/330, 502, 713/300, 320, 323, 322; 326/93, 35

(56) References Cited

U.S. PATENT DOCUMENTS

| 5,918,042 | A | * | 6/1999 | Furber | 713/600 |
| 6,140,836 | A | * | 10/2000 | Fujii et al. | 326/35 |
| 6,225,827 | B1 | * | 5/2001 | Fujii et al. | 326/98 |
| 6,247,134 | B1 | * | 6/2001 | Sproch et al. | 713/320 |
| 6,282,663 | B1 | * | 8/2001 | Khazam | 713/320 |
| 6,320,418 | B1 | * | 11/2001 | Fujii et al. | 326/93 |
| 6,389,512 | B1 | * | 5/2002 | Mahalingaiah et al. | 711/125 |
| 6,393,579 | B1 | * | 5/2002 | Piazza | 713/600 |
| 6,564,328 | B1 | * | 5/2003 | Grochowski et al. | 713/320 |
| 6,611,920 | B1 | * | 8/2003 | Fletcher et al. | 713/322 |
| 6,667,645 | B1 | * | 12/2003 | Fletcher et al. | 327/200 |
| 2002/0049918 | A1 | * | 4/2002 | Kaxiras et al. | 713/300 |

FOREIGN PATENT DOCUMENTS

JP            401102644 A    *   4/1989

* cited by examiner

Primary Examiner—Chun Cao

(57) ABSTRACT

Power consumption in a circuit is minimized. The circuit includes a pipelined circuit having a plurality of stages. A determination is made as to whether a predetermined period of time has expired. The predetermined period of time being associated with a predetermined period of time to detect a transition of an input or an output of the pipelined circuit. If the predetermined period of time is exceeded, a sequential shut-down procedure is performed on each stage in the plurality of stages of the pipelined circuit so that each stage is shut-down.

21 Claims, 8 Drawing Sheets

MINIMIZING POWER CONSUMPTION IN PIPELINED CIRCUIT BY SHUTTING DOWN PIPELINED CIRCUIT IN RESPONSE TO PREDETERMINED PERIOD OF TIME HAVING EXPIRED

FIELD OF THE INVENTION

The present invention is generally related to power management techniques for computer chips. More particularly, the present invention is generally related to reducing power consumption of a pipelined circuit in a computer chip.

BACKGROUND OF THE INVENTION

In a typical microprocessor chip, designers often use a pipelined circuit to perform certain operations, such as floating point computations, for increasing the chip's frequency. A pipelined circuit conventionally includes multiple pipeline stage circuits for performing the computations. Conventional pipeline stage circuits are often modified to increase the performance of the chip. However, high-performance pipeline stage circuits often substantially dissipate power when performing calculations. Even when functioning in an idle or sleep mode, conventional pipeline stage circuits dissipate a significant amount of power through leakage paths.

With the ever increasing demand for power in microprocessor chips, it is imperative that the power efficiency of every circuit in a microprocessor chip. Accordingly, techniques have been developed for reducing power consumption in microprocessor chips, such as placing pipeline stage circuits in a sleep mode. Techniques utilizing a sleep mode, however, tend to suffer from step-load problems. These problems result from an inductive effect in a power delivery line for the pipeline stage circuits. When pipeline stage circuits are waking up after being in a sleep mode, the circuits usually draw a large amount of current in a short period of time to sustain high-speed operation. This results in a step-load effect.

In order to overcome the step-load effect, an on-chip decoupling capacitance is enlarged or a dummy cycle is introduced in the pipeline stage circuits to prevent an inductive spike. Enlarging the on-chip decoupling capacitance, however, has not proved feasible for a variant demand for power during chip operation. Also, executing a dummy cycle tends to waste a considerable amount of power.

SUMMARY OF THE INVENTION

In one respect, the present invention includes a method for minimizing power consumption by a circuit, such as a pipelined circuit. The method includes steps of determining whether a predetermined period of time has expired, and performing a shut-down procedure on the pipelined circuit in response to the predetermined period of time having expired or elapsed. The predetermined period of time is associated with a predetermined period of time to detect a transition of a signal output by the pipelined circuit.

In another respect, the present invention includes a circuit operable to minimize power consumption by a pipelined circuit. The circuit includes a first transition detection circuit connected to a first bus and detecting transition of a signal on the first bus. The first bus is operable to carry a signal output by the pipelined circuit. A second transition detection circuit is connected to a second bus and detects transition of a signal on the second bus. The second bus being operable to transmit a signal to the pipelined circuit. A stage control circuit is connected to the first and second transition detection circuits, and the stage control circuit controls the power consumption of the pipelined circuit based on a signal received from either the first transition detection circuit or the second transition detection circuit.

In another respect, the present invention includes a circuit connected to a pipelined circuit. The circuit is operable to control power provided to the pipelined circuit, and the circuit includes a timer, a first sequencer, a second sequencer and an arbitration circuit connected to the first and second sequencers. The arbitration circuit is operable to generate signals for controlling power provided to the pipelined circuit.

In comparison to known prior art, certain embodiments of the invention are capable of achieving certain advantages, such as reducing power consumption and minimizing a step-load effect caused by an instant shut-down or power-up of an entire pipelined circuit. Those skilled in the art will appreciate these and other advantages and benefits of various embodiments of the invention upon reading the following detailed description of a preferred embodiment with reference to the below-listed drawings.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
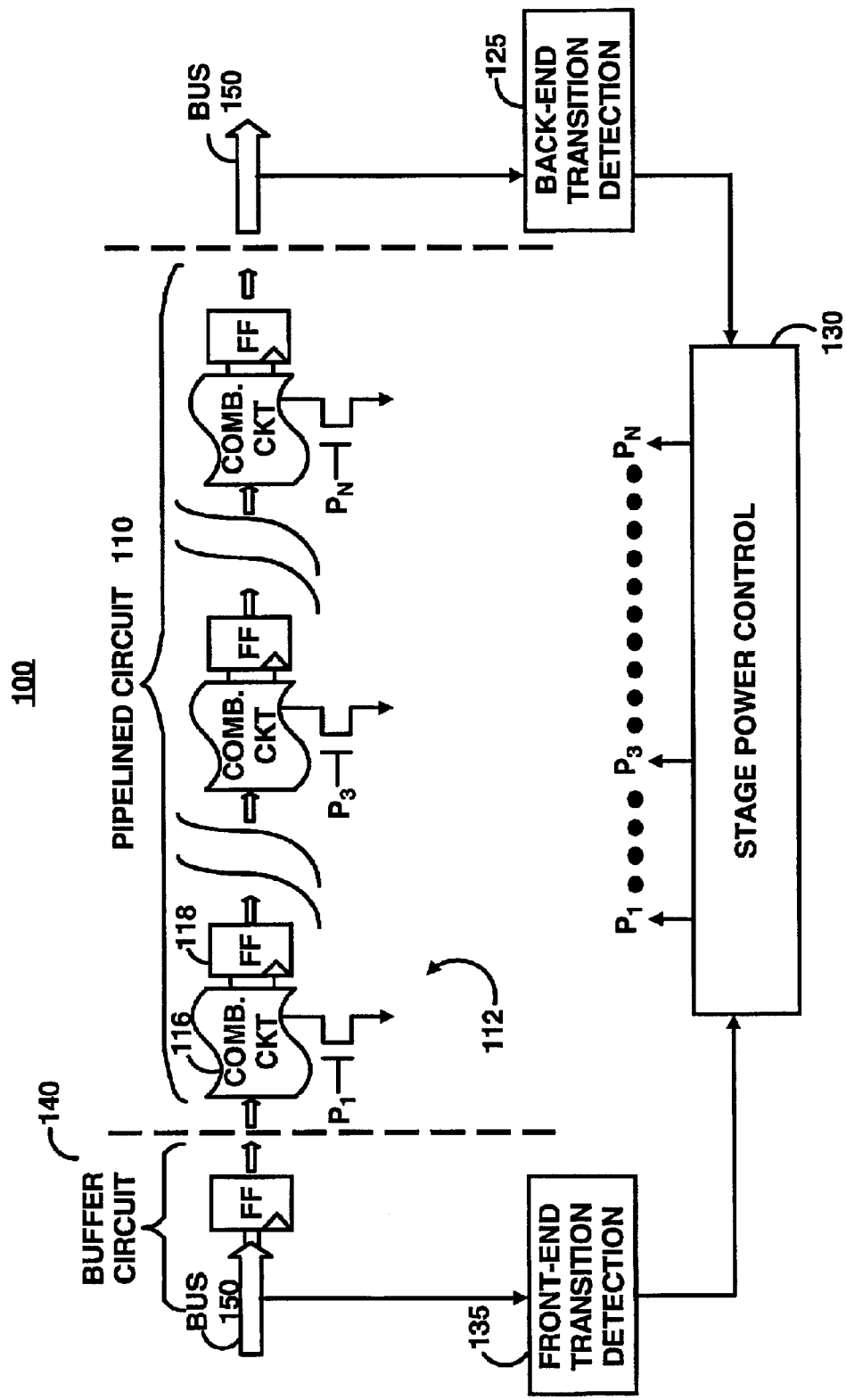
FIG. 1 illustrates an exemplary schematic block diagram of a power control circuit according to an embodiment of the present invention.

"FIG. 1 illustrates a power control circuit 100 managing power consumption and power delivery to a pipelined circuit 110. The pipelined circuit 110 includes multiple stage circuits 112, each of which includes a power switch $P_N$, conventional combinational logic circuitry 116 and a flip-flop 118. The flip-flop 118 may be a conventional flip-flop or a power saving flip-flop described in co-pending U.S. patent application Ser. No. 09/941,581 herein incorporated by reference."

The power control circuit 100 includes a back-end transition detection circuit 125, a stage power control circuit 130, a front-end transition detection circuit 135 and an optional inserted buffer circuit 140. The front-end transition detection circuit 135 and the back-end transition detection circuit 125 may include conventional circuits for detecting signal transitions on a bus, such as a transition from a high to a low or vice versa. The pipelined circuit 110 may perform data processing, including high-speed computations. The back-end transition detection circuit 125 detects a transition of a signal output by the pipelined circuit 110, such as detecting activity on a bus 150 at the output of the pipelined circuit 110. The activity may include an output of a data computation on the bus 150 from the pipelined circuit 110. The bus 150 may also connect each stage circuit 112 and may carry signals input to the pipelined circuit 110. Alternatively, multiple busses may be used to carry data to/from the pipelined circuit 110 and to interconnect the stage circuits 112. When a transition is not detected by the front-end transition detection circuit 135 or the back-end transition detection circuit 125 for a predetermined period of time, the stage power control circuit 130 sequentially controls power switches $P_1$–$P_N$ to suppress power supplied to the stage circuits 112. For example, stage power control circuit 130 sequentially opens switches $P_1$–$P_N$, starting from the front-end of the pipelined circuit 110 (i.e., at the stage circuit 112 where the data is first input to the pipelined circuit 110). Each power switch $P_N$ may be opened at predetermined intervals to reduce the risk of causing an inductive spike that may result in the step-load effect.

Figure 2:
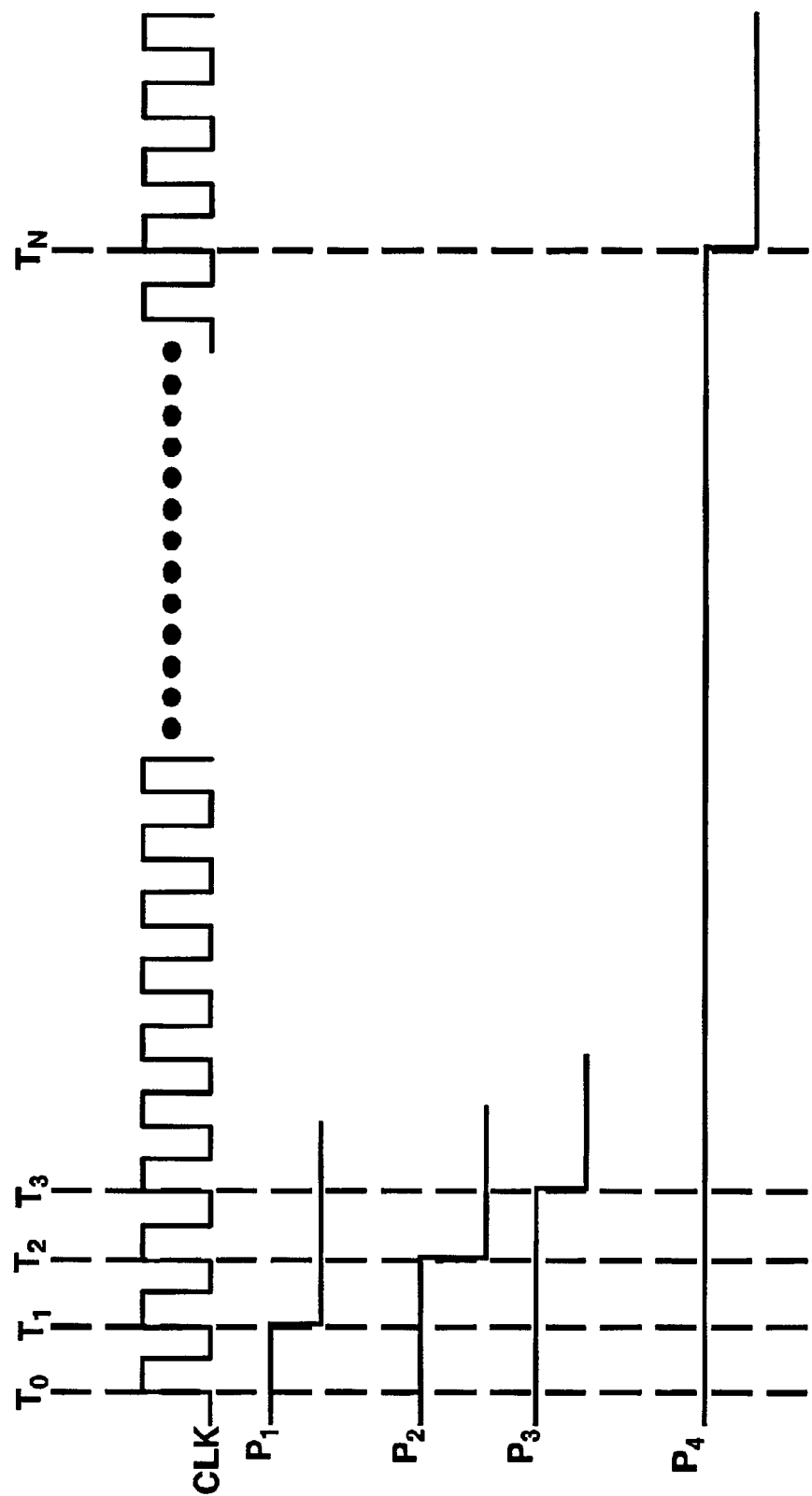
FIG. 2 illustrates a timing diagram for a power shut-down procedure utilizing the power control circuit shown in FIG. 1.

FIG. 2 illustrates a timing diagram for a power shut-down procedure performed by the stage power control circuit 130. For each clock cycle, the stage power control circuit 130 suppresses power, for example, by opening a power switch $P_N$ connected to a stage circuit 112, starting from the front-end of the pipelined circuit 110. For example, upon the detection of a shut-down command (e.g., a signal indicating that the predetermined period of time for transition detection circuits 125 and 135 to detect a transition has expired) in the first cycle $T_0$, the stage power control circuit 130 generates a signal to open switch $P_1$ at the time $T_1$. Then, at the end of a second clock cycle $T_2$ and a third clock cycle $T_3$, the stage power control circuit generates signals to open switches $P_2$ and $P_3$ respectively. The switches $P_1$–$P_N$ may sequentially be opened until the last switch $P_N$ is opened at $T_N$. Then, the pipelined circuit 110 is in a sleep mode and consumes minimal power.

When the front-end transition detection circuit 135 detects bus activity on the bus 150, such as when new data is received by the pipelined circuit 110 on the bus 150, the front-end transition detection circuit 135 transmits a wake-up signal to the stage power control circuit 130. Then, the stage power control circuit 110 sequentially controls power switches $P_1$–$P_N$ to supply power to the stage circuits 112. For example, stage power control circuit 130 sequentially closes switches $P_1$–$P_N$, starting from the front-end of the pipelined circuit 110 (i.e., at the stage circuit 112 where the data is first input to the pipelined circuit 110). Each power switch $P_N$ may be closed at predetermined intervals.

Figure 3:
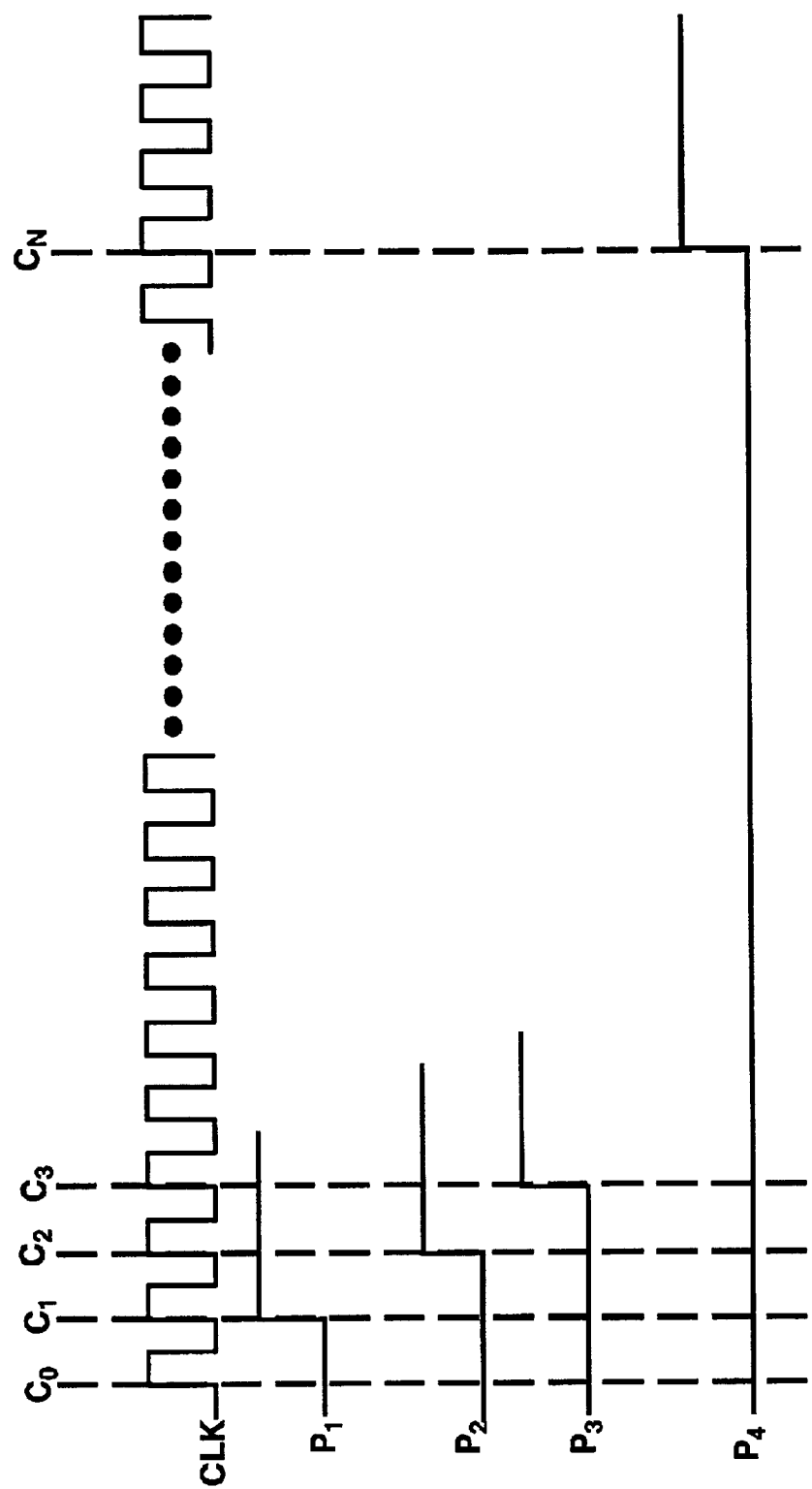
FIG. 3 illustrates a timing diagram for a power turn-on procedure utilizing the power control circuit shown in FIG. 1.

FIG. 3 illustrates a timing diagram for a power turn-on procedure performed by the stage power control circuit 130. For each clock cycle, the power control stage circuit 130 controls a power switch $P_N$, such that power is supplied to each stage circuit 112 starting from the front-end of the pipelined circuit 110. For example, upon the detection of the front end bus transition in the first cycle $C_0$, the stage power control circuit 130 generates a signal to close switch $P_1$ at the time $C_1$. Then, at the end of a second clock cycle $C_2$ and a third clock cycle $C_3$, the stage power control circuit 130 generates signals to close switches $P_2$ and $P_3$ respectively. The switches $P_1$–$P_N$ may sequentially be closed until the last switch $P_N$ is closed at $C_N$. Then, the pipelined circuit 110 is operable to perform data computations at each stage circuit 112.

In one embodiment, the circuit 100 may optionally include a buffer circuit 140. Because the transition detection circuits 125 and 135 and the stage control circuit 130 take time to respond to detected transitions, it may be necessary to insert the buffer circuit 140 in the front end of the pipelined circuit 110 to buffer the incoming data. In another embodiment, the buffer circuit 140 is not used in the circuit 100 when the latency of data moving through the pipeline circuit 110 becomes critical. In this case, the first stage circuit (i.e., the stage circuit 112 at the front-end of the pipelined circuit 110) may continually receive power and not include a power switch $P_1$, and the front-end transition detection circuit 135 may receive a signal input to the first stage circuit. Then, the first stage circuit serves as a buffer for the pipelined circuit 110. This trade-off between power consumption and speed may be determined by the system requirements.

Figure 4:
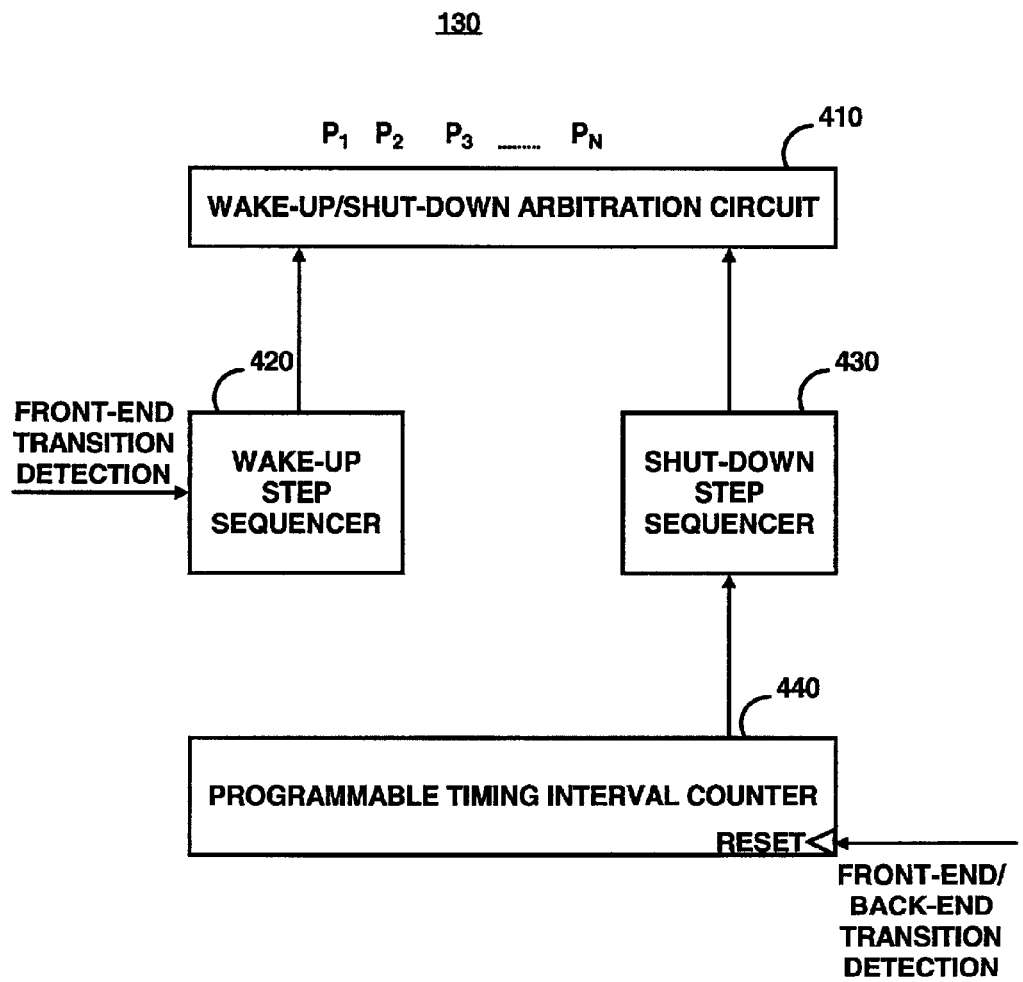
FIG. 4 illustrates an exemplary schematic block diagram of an embodiment of the stage power control circuit shown in FIG. 1.

FIG. 4 illustrates an exemplary embodiment of the stage power control circuit 130, shown in FIG. 1. The stage power control circuit 130 includes a wake-up/shut-down arbitration circuit 410, a wake-up step sequencer 420, a shut-down step sequencer 430 and a programmable timing interval counter 440. The programmable timing interval counter 440 includes a timer for measuring a predetermined period of time before the pipelined circuit 110 may be placed in sleep mode. The back-end transition detection circuit 125, shown in FIG. 1, transmits a signal to the reset input of the programmable timing interval counter 440 when a transition is detected. This causes the programmable timing interval counter 440 to restart the timer. If the programmable timing interval counter 440 is not reset by the back-end transition detection circuit 125 prior to expiration of the timer (i.e., the back-end transition detection circuit 125 does not detect a transition within the predetermined period of time), the programmable timing interval counter 440 transmits a shut-down signal to the shut-down step sequencer 430. Then, the shut-down step sequencer 430 transmits a signal to the wake-up/shut-down arbitration circuit 410, and the wake-up/shut-down arbitration circuit 410 sequentially generates signals for opening switches $P_1$–$P_N$. The front-end transition detection circuit 135 may output a signal to the reset input of the programmable timing interval counter 440, similarly to the transmission signal of the back-end transition detection circuit 125, when a transition is detected to reset the counter.

The wake-up step sequencer 420 receives a signal from the front-end detection circuit 135 when the front-end detection circuit 135 detects a transition. Then, the wake-up step sequencer transmits a signal to the wake-up/shut-down arbitration circuit 410, causing the wakeup/shut-down arbitration circuit 410 to sequentially generate signals for closing switches $P_1$–$P_N$.

The wake-up/shut-down arbitration circuit 410 may include a multiplexer (not shown) for selecting wake-up/shut-down sequential signals to control each of switches $P_1$–$P_N$ and an arbitrator (not shown) for determining which sequence(wake up or shut down) should take precedence in case of conflict. For example, a wake-up procedure typically takes precedence over a shut-down procedure. However, in order not to aggravate the step load effect, the stage power control circuit 130 may allow the shut-down procedure to temporarily progress while the wake-up procedure is gradually implemented. Also, the programming timing interval counter 440 may include a conventional timer, and the length of the predetermined period of time may be readily determined by one of ordinary skill in the art according to the configuration of the circuit 100 and other known factors. The length of the predetermined period of time may also be dictated by system requirements. The step sequencer circuits 420 and 430 are conventional circuits that may include shift registers and buffers. It will be apparent to one of ordinary skill in the art that the circuits 410–440 may be constructed from known circuits.

Figure 5A:
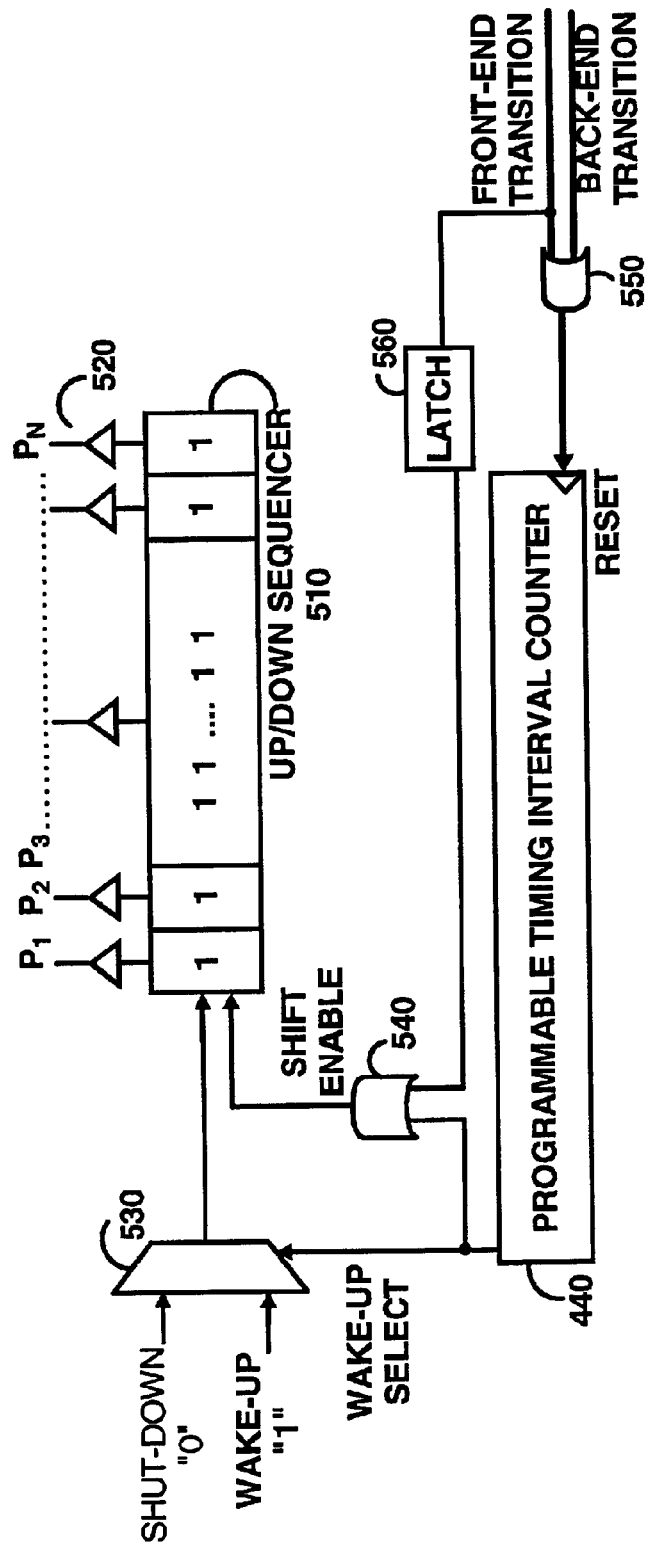
FIGS. 5(a)–(c) illustrate detailed schematic block diagrams of the stage power control circuit shown in FIG. 1.
Figure 5B:
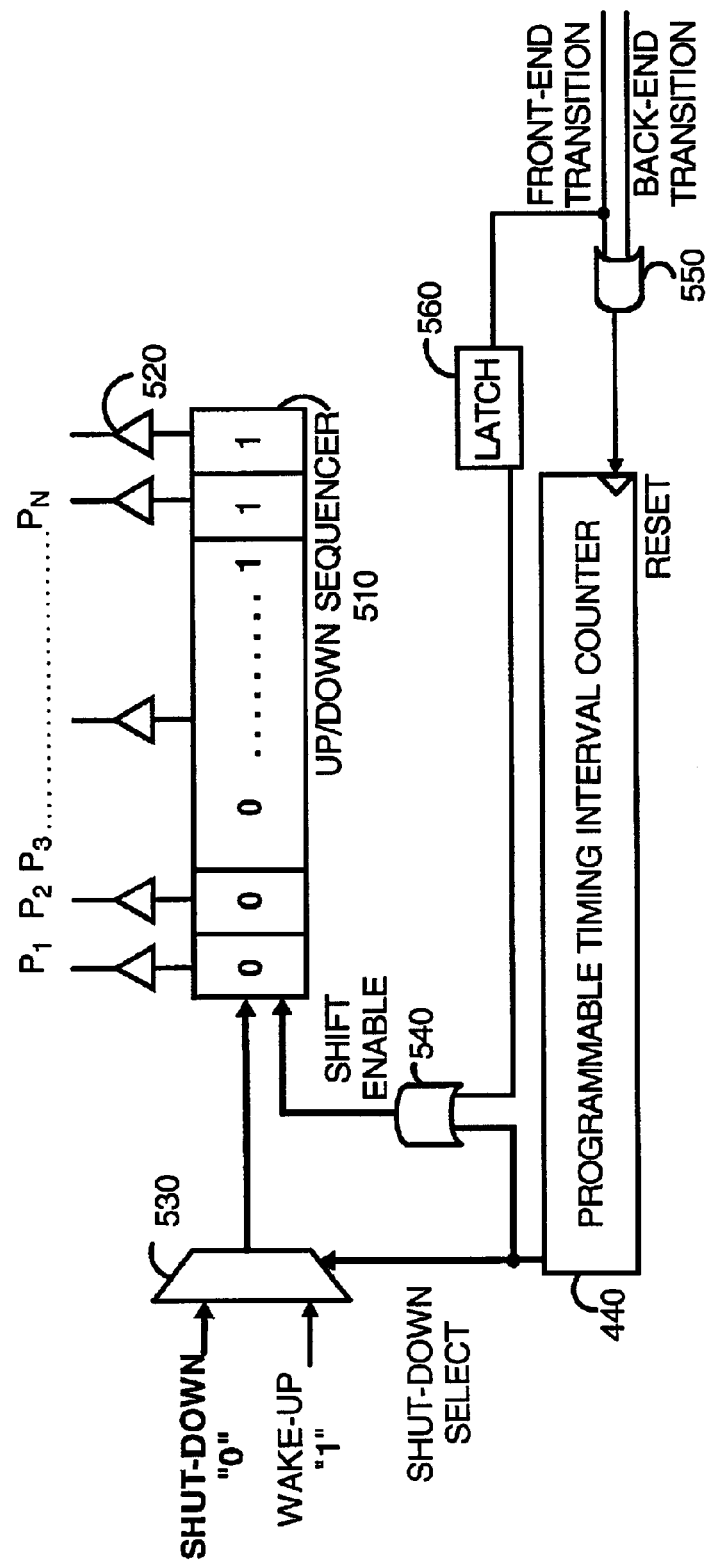
Figure 5C:
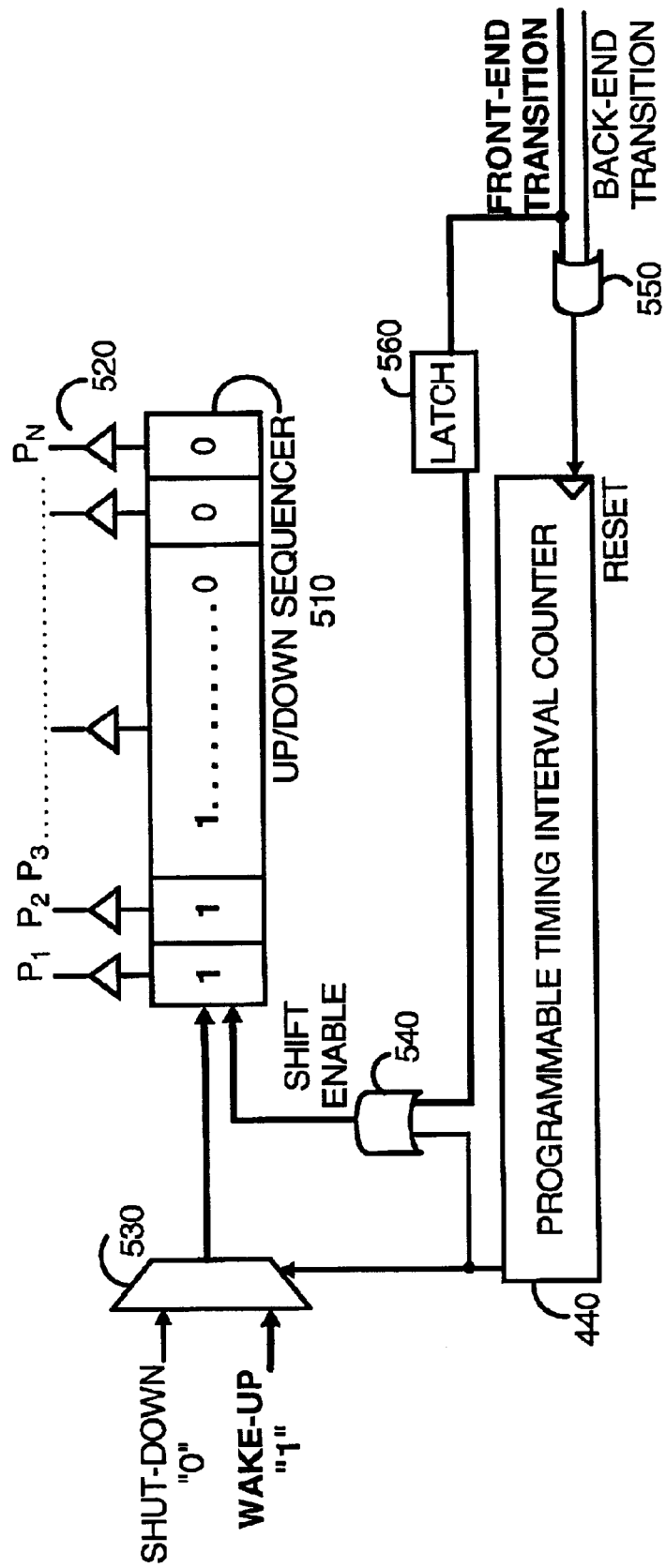

FIG. 5(*a*) illustrates an exemplary embodiment of the stage power control circuit 130 shown in FIG. 4. The wake-up/shut-down arbitration circuit 410, the wake-up step sequencer 420, and the shut-down step sequencer 430 may be implemented by an up/down sequencer 510, gates 520 for driving power switches $P_1$–$P_N$, a multiplexer 530 and a shift enable gate 540. The up/down sequencer 510 may include an N-bit shift register. The up/down sequencer 510 is connected to the multiplexer 530 and the gate 540 for controlling shifting in the up/down sequencer 510. The gate 540 may output a shift enable signal to facilitate shifting the contents of the registers in the up/down sequencer 510. A gate 550 is connected to the programmable timing interval counter 440 for controlling the reset input for the counter 440, and a latch 560 converts a transition detection pulse to a step signal transmitted to the gate 540.

The up/down sequencer 510 stores the status of switches $P_1$–$P_N$. The multiplexer 530 selects a "1" (up) or a "0" (down) to be shifted into the up/down sequencer 510 based on a signal from the programmable timing interval counter 440.

As further illustrated in FIG. 5(*a*), when the front-end or back-end transition detection circuits 135 and 125 detect activity (e.g., during an active power mode), "1's" are sequentially shifted into the up/down sequencer 510 to turn on the power switches $P_1$–$P_N$. For example, the programmable timing interval counter 440 transmits a wake-up select signal to the multiplexer 530, and the multiplexer selects "1's" for transmission to the up/down sequencer 510.

As illustrated in FIG. 5(*b*), "0's" are shifted into the up/down sequencer 510 during a shut-down procedure, such as after a predetermined period of time has expired without a bus transition being detected since the programmable timing interval counter 440 has been reset. For example, the programmable timing interval counter 440 outputs a shut-down select signal to the multiplexer 530, and the multiplexer 530 selects "0's" for transmission to the up/down sequencer 510. When a "0" is shifted into a register in the up/down sequencer 510, a corresponding gate 520 drives the corresponding power switch $P_N$ closed. If the programmable timing interval counter 440 is not reset, all the power switches $P_1$–$P_N$ will be sequentially closed. Then, the pipeline circuit 110 is in a power saving mode (i.e., a sleep mode).

If the front-end transition detection circuit 135 then detects activity, the wake-up procedure begins, as illustrated in FIG. 5(*c*). Then, "1's" are shifted into the up/down sequencer 510, causing the switches $P_1$–$P_N$ to be sequentially opened. The wake-up procedure may begin prior to all the power switches $P_1$–$P_N$ being closed.

It will be apparent to one of ordinary skill in the art that the circuit 100 may be configured to conform with certain system specifications in power management, such as the advanced configuration and power interface specification (ACPI). Also, the circuit 100 may be used as a standalone circuit or integrated in another circuit, such as a power management unit of a chip.

Figure 6:
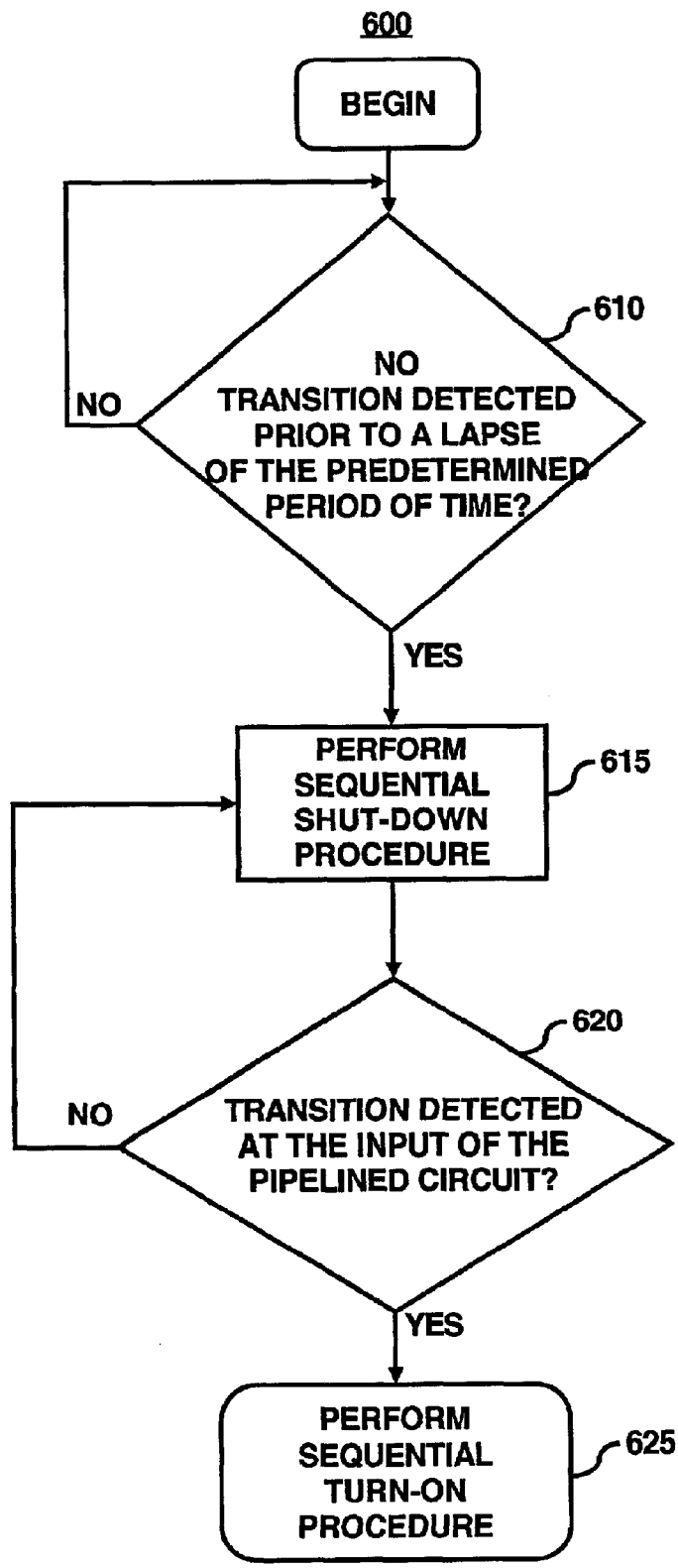
FIG. 6 illustrates a flow chart of an exemplary method employing the principles of the present invention.

FIG. 6 illustrates a method 600 for minimizing power consumption for the pipelined circuit 110. In step 610, the stage power control unit 130 determines whether no transition has been detected by either the front-end or back-end transition detection circuits 135 and 125 has at the input or output of the pipelined circuit 110 prior to the expiration of a predetermined period of time (e.g. 100 clock cycles). It will be apparent to one of ordinary skill in the art that the predetermined period of time may vary according to the configuration of the circuit 100 and other known factors. The length of the predetermined period of time may also be dictated by the system requirements.

In step 615, if no transition was detected prior to the expiration of the predetermined period of time, the stage power control circuit performs a sequential shut-down procedure. This procedure may include sequentially opening switches $P_1$–$P_N$, such as opening one switch every clock cycle starting from $P_1$. Thus, power for each stage circuit 112 is suppressed, and the power consumption is minimized.

If a transition was detected in step 610, prior to the expiration of the predetermined period of time, then the stage power control circuit 130 continues active mode operation until the predetermined period of time has expired.

In step 620, the stage power control circuit 130 determines whether a transition is detected at the input of the pipelined circuit 110 by the front-end transition detection circuit 135. If a transition is detected, the stage power control circuit 130 performs a sequential turn-on procedure (step 625). This procedure may include sequentially closing switches $P_1$–$P_N$, such as closing one switch every clock cycle starting at $P_1$. If all the switches $P_1$–$P_N$ were not opened prior to the front-end transition detection circuit 135 detecting a transition (e.g., during the sequential shut down procedure performed in the step 615), then the stage power control circuit 130 could close those switches that were opened or wait until all the switches $P_1$–$P_N$ close and let wake-up signals open switches $P_1$–$P_N$ gradually.

If a transition is not detected in step 620, the stage power control circuit 130 continues to open the switches $P_1$–$P_N$ (step 615). For example, one switch may be opened after each clock cycle until all the switches are opened or until the front-end transition detection circuit 135 detects a transition.

The method 600 shown in FIG. 6 and described above may generally be performed by the stage power control circuit 130. The steps in the method 600 can also be performed by a computer program executed by a processor, instead of the stage power control circuit 110. The computer program can exist in a variety of forms both active and inactive. For example, the computer program can exist as software comprised of program instructions or statements in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A method for minimizing power consumption by a circuit, the method comprising steps of:
   determining whether a predetermined period of time has expired, said predetermined period of time being associated with a predetermined period of time to detect a transition of an input or an output of a pipelined circuit having a plurality of stages powered on; and
   performing a sequential shut-down procedure on each state of said plurality of stages of said pipelined circuit in response to said predetermined period of time expiring such that each state of the plurality of stages is shut-down.

2. The method of claim 1, further comprising a step of detecting a transition at an input of said pipelined circuit.

3. The method of claim 2, further comprising a step of performing a turn-on procedure on said pipelined circuit in response to detecting said transition at said input.

4. The method of claim 1, wherein said shut-down procedure is performed over multiple clock cycles, and said step of sequentially suppressing power further comprises suppressing power to one of said plurality of stage circuits after each of said multiple clock cycles.

5. The method of claim 4, wherein said turn-on procedure further comprises a step of sequentially providing power to each of said stage circuits starting from said first stage circuit.

6. The method of claim 5, wherein said turn-on procedure is performed over multiple clock cycles, and said step of sequentially providing power further comprises providing power to one of said plurality of stage circuits after each of said multiple clock cycles.

7. A circuit operable to minimize power consumption by a pipelined circuit, said circuit comprising:
   a first transition detection circuit detecting transition of a first signal input to said pipelined circuit;
   a second transition detection circuit detecting transition of a second signal output by said pipelined circuit; and
   a stage control circuit connected to said first and said second transition detection circuits, said stage control circuit including a timer measuring a predetermined period of time and configured to sequentially control said power consumption of said pipelined circuit based on a comparison between a signal received from either said first transition detection circuit or said second transition detection circuit and the timer.

8. The circuit of claim 7, wherein said stage control circuit is operable to suppress power to said pipelined circuit over multiple clock cycles, and power is suppressed to one of said plurality of stage circuits after each of said multiple clock cycles.

9. The circuit of claim 7, wherein said stage control circuit is operable to reset said timer in response to receiving a signal from either said first transition detection circuit or said second transition detection circuit.

10. The circuit of claim 9, wherein said stage control circuit is operable to provide power to said pipelined circuit in response to resetting said timer.

11. The circuit of claim 10, wherein said stage control circuit is operable to sequentially provide power to one or more of said plurality of stage circuits starting from said first stage circuit.

12. The circuit of claim 11, wherein said stage control circuit is operable to provide power to said pipelined circuit over multiple clock cycles, and power is provided to one of said plurality of stage circuits after each of said multiple clock cycles.

13. The circuit of claim 12, further comprising a buffer circuit connected to an input of said pipelined circuit, said buffer being operable to store data for at least one clock cycle.

14. A circuit connected to a pipelined circuit and operable to control power provided to said pipelined circuit, said circuit comprising:
   an up/down sequencer operable to perform a shut-down procedure or a turn-on procedure to control power applied to a plurality of stage circuits in said pipelined circuit; and
   at least one transition detection circuit detecting activity on a bus connected to said pipelined circuit, and said up/down sequencer performing said turn-on procedure in response to said at least one transition detection circuit detecting activity on said bus; and a timer, wherein said up/down sequencer performing said shut-down procedure in response to said timer expiring.

15. The circuit of claim 14, wherein said circuit further comprises a multiplexer connected to said timer, said at least one transition detection circuit and said up/down sequencer, whereby said multiplexer transmits a turn-on signal to said up/down sequencer in response to said at least one transition detection circuit detecting activity on said bus, and said multiplexer transmits a shut-down signal to said up/down sequencer in response to said timer expiring.

16. The circuit of claim 15, wherein said shut-down procedure sequentially suppresses power supplied to said plurality of stage circuits.

17. The circuit of claim 16, wherein said turn-on procedure sequentially supplies power to said plurality of stage circuits.

18. The circuit of claim 17, wherein said at least one transition detection circuit comprises one or more of a front-end transition detection circuit operable to detect activity on a bus connected to a front-end of said pipelined circuit and aback-end transition detection circuit operable to detect activity on a bus connected to an output of said pipelined circuit.

19. A system for minimizing power consumption by a pipelined circuit having a plurality of stages, said system comprising:

means for detecting an amount of time since said pipelined circuit sent an output signal;

means for comparing said amount of time to a predetermined amount of time; and means for sequentially reducing power to each stage of said plurality of stages if said amount of time is greater than said predetermined amount of time.

20. The system of claim 19, further comprising:

means for detecting a second amount of time since said pipelined circuit received an input signal;

means for comparing said second amount of time to a second predetermined amount of time; and means for sequentially increasing power to each stage of said plurality of stages if said second amount of time is greater than said second predetermined amount of time.

21. The system of claim 20, further comprising:

means for arbitrating between said means for detecting said first amount of time and said means for detecting said second amount of time to determine whether to activate said means for sequentially increasing power or said means for sequentially decreasing power.

* * * * *